United States Patent [19]

Gunew et al.

[11] 3,929,004

[45] Dec. 30, 1975

[54] METHOD AND APPARATUS FOR MONITORING MATERIALS DISSOLVED OR SUSPENDED IN LIQUID

[75] Inventors: Dimiter Stefanoff Gunew, St. Albans; Ronald John Herniman, North Balwyn, both of Australia

[73] Assignee: ICI Australia Limited, Melbourne, Australia

[22] Filed: Nov. 26, 1973

[21] Appl. No.: 419,102

[30] Foreign Application Priority Data
Dec. 15, 1972 Australia.............................. 1644/72
June 21, 1973 Australia.............................. 3792/73

[52] U.S. Cl........... 73/61.1 C; 23/254 EF; 210/31 C
[51] Int. Cl.²......................................... G01N 31/08
[58] Field of Search............. 73/61.1 C, 61 R, 61.3, 73/23.1; 210/31 C, 198 C; 23/254 EF; 198/209

[56] References Cited
UNITED STATES PATENTS
3,128,619   4/1964   Lieberman........................... 73/23.1
3,533,751   10/1970  Maggs............................ 73/61.3 UX
3,566,677   3/1971   Cole et al. ........................... 73/61.3
3,744,973   7/1973   Dubsky........................... 23/254 EF FOREIGN PATENTS OR APPLICATIONS
233,283   12/1968   U.S.S.R............................... 73/61 R
 23,791   11/1967   Japan................................. 73/23.1

Primary Examiner—Jerry W. Myracle
Assistant Examiner—Joseph W. Roskos
Attorney, Agent, or Firm—Cushman, Darby & Cushman

[57] ABSTRACT

A monitor for a liquid stream including a carrier liquid and at least one component dissolved or suspended therein, wherein the monitor comprises a porous conveyor in the form of a non-supple annulus or band capable of axial rotation and which traverses a gasifying chamber which encloses the conveyor in a manner so as to prevent the escape of the gasified component from the chamber without it first being exposed to a monitoring means. The monitor may advantageously be used with liquid chromatographs.

19 Claims, 3 Drawing Figures

U.S. Patent  Dec. 30, 1975  3,929,004
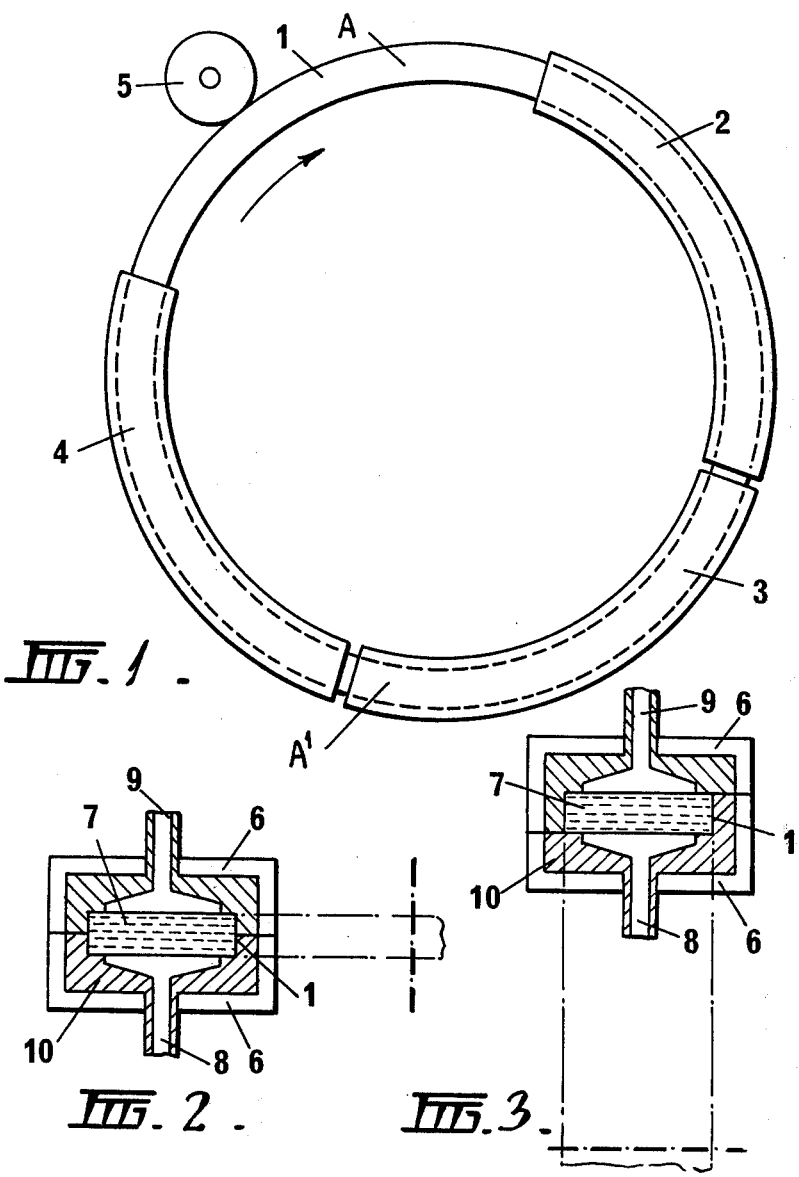

METHOD AND APPARATUS FOR MONITORING MATERIALS DISSOLVED OR SUSPENDED IN LIQUID

This invention relates generally to methods and apparatus for the detection or measurement of materials dissolved or suspended in liquid streams.

The invention is useful for making determinations on a batch basis, but it has special utility for the continuous monitoring of liquid streams. It can, for example, be used advantageously to sample streams derived from natural waters or to monitor streams derived from chemical processes. The invention is of particular utility in the monitoring of effluent streams from liquid chromatographs.

In the analysis of liquid streams including a carrier liquid and one or more high-boiling components dissolved or suspended therein, it is common practice to deposit a sample of the stream on a non-porous conveyor. The sample may comprise all or part of the stream. The sample-loaded conveyor is moved into a heated zone where the carrier liquid and any low-boiling components are removed, leaving any high-boiling components therein on the conveyor as a residue. The conveyor subsequently is moved into the flame of a flame ionization detector, where the residue is oxidized to a gas phase, producing a signal in the detector output indicative of the presence of any high-boiling component originally contained in the stream. Alternatively, the residue-carrying conveyor is moved into a second heated zone where at least a part of the residue is converted to the gas phase by volatilization, pyrolysis or chemical reaction, the gas so produced being monitored by any suitable mass detector for indicating the presence of any high-boiling components originally contained in the stream. The output from the detector usually is connected to a recorder.

In those instances where it is desired to measure the quantity of a high-boiling component dissolved or suspended in the liquid stream it is common practice to deposit on the conveyor a sample which as nearly as possible represents an aliquot portion of the original liquid stream, so that the output signal from the detector can be related not only to the presence but to the quantity and time of passage of such components in the stream.

In systems of the kind described, the non-porous conveyor often comprises a metallic wire or chain, usually in the form of an endless loop. A typical chain conveyor consists of generally circular loops linked one to another. Wire conveyors typically consist of uncoiled wire or wire wound to form a continuous helix. The conveyor usually is loaded with samples of the liquid of interest by passing the conveyor under the tip of a dispenser which drips or sprays the liquid onto the conveyor or forms a suspended drop of liquid through which the conveyor is passed.

Although prior art systems utilizing conveyors of the kinds just referred to have been operable they are subject to serious limitations which are reflected in what is often an intolerable amount of background noise in the detector output. As a result, signals corresponding to components contained in the liquid carrier are totally obscured or broadened to the point where they cannot be identified. One cause of noise in systems of the type described is uneven distribution of the deposited liquid sample along the conveyor. Such uneven distribution may be caused by the type of dispenser used, or by the rate of feed from the dispenser exceeding the capacity of the conveyor. The conveyors of the kind referred to above can also contribute to noise in the detector output by promoting uneven distribution of the deposited sample. For example certain chain conveyors generate noise because they are subject to the so-called "run-along" — a term referring to diffusion of the solute and mass transfer of the liquid between linked and liquid-filled chain loops. Such "run-along" occurs also when a conveyor is in the form of a conventional solid metal band. Where the sample is a solution containing a solute, run-along results in a variable net movement of the solute toward the above-mentioned heated zone where the liquid carrier is removed. Thus, because of run-along the samples are not truly representative. One objectionable result of run-along is broadening of the peak width in the detector output signal. Run-along also is undesirable because it causes the detector output to be a complex function of the residence time of the chain or band in the carrier removal zone and the degree of tilt of the conveyor from the horizontal. In the absence of run-along the function would be essentially linear. The conventional conveyor systems also suffer from a further disadvantage in that the sensitivity of such systems in determining qualitative or quantitative amounts of solute in liquid streams is comparatively low. This lack of sensitivity resides to a large extent in the fact that it is difficult to ensure that the full amount of the liquid stream dispensed on to the conveyor remains on the conveyor until it reaches the heated zone wherein the carrier liquid is evaporated. In many instances it has been observed that a proportion, often a major proportion, of the liquid stream issuing from the dispenser has not been retained on the conveyor and thus the amount of solute reaching the heated zone has been reduced.

Despite many attempts to improve the resolution and/or sensitivity of such monitoring systems by modification of the dispensing means or the conveyor means the efficacy of such systems leaves much to be desired. Thus it has been proposed to use as a conveying means a flat rotating disc like body, very similar to a conventional gramophone record, which is rotated by a shaft located centrally in the disc. The area of the disc in the vicinity of the circumference thereof is used as the collecting portion of the conveying means and gasification of the collected material is effected from this area. Such a device suffers from the disadvantage that because of the shape and construction of the disc and the method of rotating it there is an undesirable gap in the wall of the gasifying oven through which the disc protrudes. It is therefore difficult to seal the gap in the wall of the gasifying oven without unduly affecting the operation of this prior art device and consequently the gasified material undesirably tends to escape through the gap in the oven wall. We have now found that the limitations and deficiencies of monitoring systems of the kinds described may be reduced considerably if there is used in such a system a conveyor which differs essentially from the conveyors of the prior art.

Accordingly we provide in a monitor for a liquid stream including a carrier liquid and at least one component dissolved or suspended therein comprising, in combination, a means for dispensing said liquid stream, a conveyor capable of receiving at least a part, preferably all, of said liquid stream, a carrier removal chamber or space traversed by said conveyor and maintained at a temperature selected to remove said carrier liquid and leave said component or components on said conveyor as a residue, means for heating said conveyor in a gasifying chamber to gasify said residue and means for monitoring said gasified residue to generate an output signal indicative of the presence of said component or components in said stream the improvements wherein firstly said conveyor comprises a non-supple, preferably flat, annulus or band of which at least a part is porous and which is of uniform radius and mounted so as to be capable of axial rotation; and secondly said gasifying chamber encloses said conveyor in a manner such that said gasified residue is prevented from escaping from said gasifying chamber without first being exposed to said monitoring means. Suitably the conveyor may be rotated by magnetic or mechanical means and this latter means is preferred. Thus for example the conveyor may be rotated by frictional or toothed driving means in contact with an unenclosed part of the circumference of the annulus. Yet again the annulus may be rotated by means of a pinion which engages with a rack incorporated with or attached to the body of the annulus and preferably being incorporated with or attached to the surface thereof remote from the surface on which the liquid stream is received. Suitably the gasifying chamber may be attached, for example screwed, to the frame of the bearing surface on which the annulus rotates so as to provide a sealed chamber. By the term non-supple we mean that the conveyor is not easily bent without cracking or breaking. Thus such a non-supple annulus may have differing physical forms ranging from a stiff, unyielding, firm, or rigid form to a form wherein only slight deflection of the annulus is possible. In another embodiment of said conveyor the conveyor may be a porous non-supple band in the form of an endless loop somewhat similar, apart from the characterizing porosity of the band, to the solid non-porous flexible bands of the prior art.

The conveyor which is incorporated in our monitor may be made from a diversity of materials. Thus it may be made from porous polymeric materials of high softening point for example polysulphones. However in this embodiment care should be exercised to ensure that the polymeric material is inert to the carrier liquid and solute and that the temperatures of operation are sufficiently low to ensure that decomposition of the polymeric material does not occur. From amongst other fabrication materials there may also be mentioned refractory materials. It is preferred that the conveyor be fabricated from porous ceramic or glass materials or from metals or alloys of metals. Metals in a sintered powder form or in the form of woven mesh, for example a stainless steel gauze, are particularly suitable. Thus a conveyor may be made from a single mesh or a multiplicity of meshes which may be of similar or differing apertures suitably in the range from about 0.5 to 0.05 mm. So as to provide a conveyor of suitable rigidity when a non-supple annulus is used it may sometimes be necessary to support finer gauze materials on a reinforcing support although when coarser gauzes are used this step is not usually necessary. In the instances where porous ceramic or glass materials are used it may be difficult to obtain such materials in sufficiently large sizes to form a continuous conveyor therefrom. Under such circumstances it lies within our invention to use as a conveyor fabricated from a multiplicity of interlocking ceramic or glass shaped articles suitably supported to form an annulus of desired dimensions. When porous glass or ceramic materials are used in a conveyor suitable for use in our invention the pores therein are suitably of a size in the range from 1 to 100 microns. In a further embodiment of our conveying means the conveyor may be fabricated from a base plate on which there has been deposited a layer of material which has a relatively high surface area in comparison to its overall thickness. For example a porous or porolated layer of metal may be deposited by plating, spraying or sintering means on to a ring like or annular support. Such a conveying means wherein the deposited layer may be, for example, only a few microns thick is particularly useful when a component of interest is difficult to gasify. Thin ceramic materials also are very suitable for use with components of this type provided they are supported suitably so as to minimize breakage. The nature of material or materials from which a conveyor is fabricated is merely a matter of choice dependent on the nature of the stream being monitored and the physical characteristics, for example the porosity or the surface tension characteristics, of the fabricated conveyor whereby it is capable of retaining the liquid stream dispensed on to it.

The dimensions of the conveyor used in our invention may be chosen so that the conveyor may be incorporated conveniently into the monitor. Suitably the width of the conveying surface, in the instance of an annulus ring or band conveyor may be chosen with regard to the rate of dispensation of the liquid stream on to the conveyor. The thickness of the porous portion of the conveyor should also be chosen in relation to the physical characteristics of the liquid stream and the nature of the component or components of interest dissolved or suspended therein. A suitable form of conveyor for any particular monitoring process is best determined by simple experimentation. In many instances a conveyor may be used for a multiplicity of monitoring purposes. Thus for example the annular conveyor referred to hereinbefore is very useful for many purposes and the conveying surface may be in a variety of shapes. Thus an annular conveyor in one embodiment of our invention may be described as being similar in shape to that of a washer used for engineering purposes. Thus the conveying surface in this embodiment is substantially flat. In another embodiment the conveyor may be described as being similar in shape to a ring or tube wherein the surface of the conveyor is curved. A very suitable size for many monitoring processes is an annular conveyor wherein the overall diameter is of the order of from 10 to 35 cm, whilst the width of the conveying surface is of the order of from 0.5 to 3 cm and the thickness of the conveyor is suitably in the range from 0.5 to 5 mm. The dispensing means is of a known type. Suitably it may be fitted if desired with a spray or nozzle and optionally may be movable to promote a more even distribution of the stream on to the conveyor.

The improved apparatus of our invention is useful in monitoring liquid streams including a carrier liquid and at least one component dissolved or suspended therein.

Accordingly we provide a method of monitoring a liquid stream including a carrier liquid and at least one component dissolved or suspended therein which method comprises dispensing at least a part, preferably all, of said stream on to a traversing conveyor which comprises a non-supple, preferably flat, annulus or band of which at least a part is porous and which is of uniform radius and which is mounted so as to be capable of axial rotation and capable of retaining at least a part, preferably all, of said dispensed liquid stream, traversing said conveyor through a heated zone to remove said liquid carrier and leave said component or components as a residue on said conveyor, heating the residue-carrying conveyor to gasify said residue in a gasifying chamber which encloses said conveyor in a manner such that said gasified residue is prevented from escaping from said gasifying chamber without first being exposed to a monitoring means comprising a gas chromatography detector capable of generating a signal denoting the presence of said component or components when exposed to said gasified residue.

Whilst reference has been made in the description of the method outlined above to a heated zone it will be appreciated that this has been done to facilitate description. It lies within our invention to provide a multiplicity of heated zones each of differing temperatures or to provide a range of temperatures within any one such zone. The zone or zones may be heated by conventional means. We have found that radio frequency or induction heating means are very effective for heating the zones and providing a means for gasifying the residue on the conveyor. So as to promote evaporation of the carrier liquid or to facilitate the transfer of the gasified sample there may be used as a processing aid a stream of gas, for example nitrogen, which may be passed across the surface or through the body of the conveyor. In instances where the conveyor is used on a continuous basis it is convenient to provide one or more additional heated zones whereby the conveyor is cleaned if necessary subsequent to the gasification step. Optionally such cleaning may be performed by chemical or mechanical means when the conveyor is used in an intermittent or batch wise manner.

The monitor of our invention conveniently may be incorporated into a liquid chromatographic system. It is especially convenient for use with high pressure liquid chromatographic systems wherein liquid streams having one or more components dissolved or suspended therein are pumped at high pressures, for example up to about 350 kg/sq.cm, at flow rates from about 0.2 to 10 ml per minute, through packed columns, dispensed on to a conveying means and thereafter being treated and converted to a form suitable for qualitative or quantitative analysis.

Because the improved conveyor of our invention is constructed of materials which are conducive to the adsorption or absorption of liquid streams on their surface or in their intersticies there is provided a means of locating the streams, and the components of interest therein, in a more even manner on the instant conveying means than has been possible with prior art conveyors. Furthermore a greater proportion of the liquid streams is retained on the instant conveyor than with prior art conveyors. Consequently when our monitoring systems are used for the detection or measurement of materials dissolved or suspended in liquid streams there is obtained an enhanced resolution and sensitivity in the signals generated in the detector system denoting the component or components of interest than has hitherto been possible.

The apparatus and process of the present invention are useful for the analysis of a wide range of compounds. It is particularly useful for the examination of complex mixtures, often in widely varying concentration ratios, in fields such as drugs, pesticides, high molecular weight aromatics, plasticizers, antibiotics, organic chemicals generally, biochemicals and the like. As examples of some of the classes of compounds which may be analysed by high pressure liquid chromatography using our device and process there may be mentioned simple aromatic compounds such as phenyl alcohols, alkyl substituted phenols, amines, pyridines and quinolines, nitrobenzene and derivatives, benzoic acids, phthalic acids and derivatives, sulphur and selenium heterocyclic compounds, anthraquinone derivatives, polynuclear aromatic compounds; antioxidants such as amines, t-butyl phenols, polyhydric phenols, hydroquinones; long chain phthalate esters; pesticices such as DDT, carbaryl, phosphorus insecticides; herbicides such as phenoxyacetic acid derivatives, carboxanilides, urea derivatives; drugs, analgesics and antibiotics such as aspirin, caffeine, sulphonamides, penicillins; biochemicals and natural products such as steroids, nucleic acid bases, ribonucleosides, alkaloids.

So that our invention may be more easily understood there follows a description of embodiments thereof with reference to the appended drawings which are merely diagrammatic representations and are not to scale.

FIG. 1 is a line diagram in plan of an illustrative form of a first embodiment of apparatus for practicing the present invention.

FIG. 2 is a cross-section of part of FIG. 1 at point A'.

FIG. 3 is a cross-section of a second embodiment of apparatus for practicing the present invention. The apparatus is substantially as shown in FIG. 1 but the conveyor shape has been modified.

In a first embodiment of our invention an annular conveyor 1 according to the invention is rotated axially on a bearing surface 10 by friction or toothed driving means 5 in the direction of the arrow. A liquid stream comprising a carrier liquid containing components dissolved or suspended therein and issuing from a dispensing means, not shown, is applied to the surface of conveyor 1 at point A and is retained on wire mesh 7. The loaded conveyor then is moved through a zone 2 which is covered by insulating material 6 and heated to a comparatively low temperature to volatilize the carrier liquid, leaving the components therein as a residue on the conveyor 1. The zone 2 preferably is swept with an inactive gas to assist in the removal of the volatilized carrier liquid. The residue-carrying conveyor then moves from zone 2 through a zone 3 maintained at a temperature effective to convert all or a portion of the residue to a gas phase. Conveniently zone 3 may be an insulated furnace provided with one or more heating means. A stream of gas is passed through zone 3 and as this stream passes from gas entry port 8 through the porous material 7 of conveyor 1 to gas exit port 9 it carries the gasified residue from point A' on the conveyor 1 to any suitable gas chromatography mass detector, not shown, responsive to the gasified residue — such as a flame ionization detector, a Katharometer, an argon ionization detector or a gas density balance. The conveyor is then moved through a zone 4 maintained at a temperature sufficiently high to remove small amounts of residual impurity thus ensuring that point A on the conveyor 1 is clean prior to receiving further amounts of the liquid stream. So as to facilitate the above description reference has been made to the application of the liquid stream at only one particular point on the conveyor, and that only one revolution of the conveyor has been considered. It will be appreciated that the liquid stream may be dispensed in a continuous or intermittent manner on to the conveyor and that the composition of the liquid stream may be changed if desired so that a series of determinations may be made.

In a second embodiment of our invention the conveyor is in the form of a ring or tube which is rotated about its longitudinal axis by frictional or toothed means 5 and operated in a manner similar to that for the annular conveyor described above. A cross-section of this second embodiment is depicted in FIG. 3.

Our invention is now illustrated by, but in no way limited to, the following examples.

EXAMPLE 1

A sample of wheat seed which had been treated with a fungicidal composition was extracted with methanol. The extract was reduced in volume by evaporation and the bulk of methanol was replaced by dioxan to provide a solution containing the fungicide and amenable to analysis by high pressure liquid chromatography. A carrier-liquid mixture consisting of 97 parts by volume of n-hexane and 3 parts by volume of dioxan was pumped by means of a constant-flow rate pump at an inlet pressure of about 35 kg/sq. cm through an analytical column of a high pressure liquid chromatographic apparatus. The analytical column contained as a first adsorbent a magnesium silicate type available commercially under the Trade Name of "Florisil" and as a second adsorbent a pellicular type of material available commercially under the Trade Name of "Corasil" I. Into the n-hexane/dioxan misture referred to above there was injected an aliquot of the solution containing the fungicide. The liquid stream so formed passed firstly through the "Florisil" adsorbent, then through the "Corasil" I adsorbent and finally emerged from the analytical column at a rate of 3.8 ml/minute. The emerging stream was distributed on to a conveyor which was in the form of a flat ring of sintered stainless steel. The ring had an overall diameter of 30 cm and the conveyor portion was 1.25 cm wide and 1.5 mm thick. The porosity of the conveyor was similar to that of a conventional No 3 glass frit filter. The loaded conveyor was rotated so that it passed through an insulated oven heated to a temperature of 70°C whereupon the carrier liquid was evaporated. Evaporation of the carrier liquid was assisted by passing a stream of nitrogen through the oven. The conveyor carrying the solute from the liquid stream then traversed a furnace at a temperature of 600°C and through which a stream of nitrogen was passing. The solute was pyrolysed and the resultant vapour was fed in a stream of nitrogen to a flame ionization detector where a signal was produced which was amplified and displayed on a potentiometric recorder. The conveyor then traversed a furnace maintained at about 750°C and during this traverse small amounts of residual material were removed from the conveyor thus ensuring that the conveyor was clean prior to receiving additional amounts of the liquid stream emerging from the analytical column. Comparison of reference standard potentiometric recordings with the recording produced as described above showed that the fungicidal solute from the liquid stream was essentially 5,6-dihydro-2-methyl-1,4-oxathiin-3-carboxanilide.

EXAMPLE 2

A strip of stainless steel gauze having apertures of about 0.125 mm was superimposed and welded at intervals on to a strip of stainless steel gauze having apertures of about 0.50 mm. The resultant product, which was 2.5 cm wide, formed as an endless loop to form a conveyor for use according to this invention and used to replace a platinium alloy chain conveying means in a commercially available liquid chromatography monitor. The conveyor was actuated over a series of pulleys by means of a nip drive so that it passed below the tip of a dispenser from which there was issuing at the rate of 1.5 ml/minute a liquid stream from a liquid chromatographic analytical column. The liquid stream contained 0.05 % w/v of dissolved solids and the carrier liquid was a mixture consisting of 97 parts by volume of n-hexane and 3 parts by volume of dioxan. The liquid stream was conveyed through heated zones where the carrier liquid was evaporated and the solute in the stream was gasified. The resultant vapour was fed in a stream of nitrogen to a flame ionization detector where a signal was produced. The amplified signal as displayed on a potentiometric recorder was consistent with that recorded from an authentic sample of 3-(3,4-dichlorophenyl)-1,1-dimethylurea.

We claim:

1. In a monitor for a liquid stream including a carrier liquid and at least one component dissolved or suspended therein comprising, in combination, a means for dispensing said liquid stream, a conveyor capable of receiving at least a part of said liquid stream, a carrier removal chamber or space traversed by said conveyor and maintained at a temperature selected to remove said carrier liquid and leave said component or components on said conveyor as a residue, means for heating said conveyor in a gasifying chamber to gasify said residue and means for monitoring said gasified residue to generate an output signal indicative of the presence of said component or components in said stream the improvements wherein firstly said conveyor comprises a non-supple annulus of which at least a part is porous and which is of uniform radius and mounted so as to be capable of axial rotation; and secondly said gasifying chamber surrounds a portion of said conveyor and includes bearing surfaces in engagement with the edge portions of said annulus in a manner such that said gasified residue is prevented from escaping from said gasifying chamber without first being exposed to said monitoring means.

2. A monitor according to claim 1 wherein said conveyor comprises a flat annulus.

3. a monitor according to claim 1 wherein said conveyor is in the form of an endless loop.

4. A monitor according to claim 1 wherein said conveyor is rotated by mechanical means.

5. A monitor according to claim 1 wherein said conveyor is fabricated from material selected from the group consisting of metals and alloys thereof.

6. A monitor according to claim 5 wherein said metal is in a sintered powder form.

7. A monitor according to claim 5 wherein said metal is in the form of woven mesh.

8. A monitor according to claim 7 wherein the aperture of said mesh is in the range from 0.05 to 0.5 millimetre.

9. A monitor according to claim 1 wherein said conveyor is fabricated from material selected from the group consisting of porous ceramic and glass.

10. A monitor according to claim 9 wherein the pore size of said material is in the range from 1 to 100 microns.

11. A monitor according to claim 1 wherein said conveyor comprises a porous or porolated layer of metal supported on a baseplate.

12. A monitor according to claim 1 wherein said conveyor comprises ceramic material supported on a baseplate.

13. A monitor according to claim 1 where said conveyor is an annular conveyor wherein the overall diameter thereof is in the range from 10 to 35 centimetres, the width of the conveying surface is in the range from 0.5 to 3 centimetres and the thickness of the conveyor is in the range from 0.5 to 5 millimetres.

14. A liquid chromatographic apparatus comprising a monitor according to claim 1 and including a packed column and means for pumping the liquid stream through the packed column.

15. A liquid chromatographic apparatus according to claim 14 wherein said apparatus is a high pressure liquid chromatographic apparatus.

16. An apparatus according to claim 15 wherein said apparatus is capable of pumping said liquid stream at a pressure of up to 350 kg/sq.cm at a flow rate in the range from 0.2 to 10 ml per minute.

17. A monitor as in claim 1 wherein said annulus is porous and wherein said gasifying chamber includes a gas inlet port adjacent one side of the annulus and a gas outlet port adjacent the opposite side of the annulus whereby a gas stream may be passed through the annulus, said monitor further including a gas chromatography detector for receiving the gas stream from the gasifying chamber.

18. A method of monitoring a liquid stream including a carrier liquid and at least one component dissolved or suspended therein which method comprises dispensing at least a part of said stream on to a traversing conveyor which comprises a non-supple annulus of which at least a part is porous and which is of uniform radius and which is mounted so as to be capable of axial rotation and capable of retaining at least a part of said dispensed liquid stream, traversing said conveyor through a heated zone to remove said liquid carrier and leave said component or components as a residue on said conveyor, heating the residue-carrying conveyor to gasify said residue in a gasifying chamber which encloses said conveyor in a manner such that said gasified residue is prevented from escaping from said gasifying chamber without first being exposed to a monitoring means comprising a gas chromatography detector capable of generating a signal denoting the presence of said component or components when exposed to said gasified residue.

19. A monitor for a liquid stream which includes a carrier liquid and at least one component dissolved or suspended therein, said monitor comprising: a conveyor for receiving a dispensed portion of the liquid stream, said conveyor including a non-supple endless annular member of which at least a portion is porous and which is of uniform radious and mounted so as to be capable of axial rotation, said annular member having oppositely disposed edge portions; a carrier removal chamber of space traversed by said conveyor and maintained at a temperature selected to remove the carrier liquid and leave the dissolved or suspended component on the annular member as a residue; means forming a gasifying chamber in which a portion of the annular member is heated to gasify the residue, said gasifying chamber surrounding a portion of said annular member and including bearing surfaces in engagement with the edge portions of the annular member; and a monitoring means for monitoring the gasified residue formed in the gasifying chamber to generate an output signal indicative of the presence of the component in the liquid stream.

* * * * *